2,844,505

Patented July 22, 1958

2,844,505

FUNGICIDAL COMPOSITIONS COMPRISING PHENYLOSAZONES

Robert E. Miller and Van R. Gaertner, Dayton, Ohio, assignors to Monsanto Chemical Company, St. Louis, Mo., a corporation of Delaware No Drawing. Application September 21, 1954
Serial No. 457,551

16 Claims. (Cl. 167—30)

This invention relates to new and useful improvements in biological toxicants. The invention further relates to methods of treating plants and other organic materials which are subject to attack by fungi and is particularly concerned with the eradicants for cereal rusts, especially wheat rust.

We have found that unusually effective fungicidal compositions are obtained when the active ingredient is an osazone selected from the class consisting of those osazones having the formula

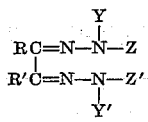

in which R and R' are selected from the class consisting of hydrogen, hydrocarbon radicals free of non-benzenoid unsaturation, such as aliphatic and aromatic hydrocarbon radicals, and containing from 1 to 12 carbon atoms, and nitro-substituted aryl radicals of from 6 to 12 carbon atoms, Y and Y' are hydrocarbon radicals free of non-benzenoid unsaturation, such as aliphatic and aromatic hydrocarbon radicals, and containing from 1 to 12 carbon atoms and Z and Z' are selected from the class consisting of hydrogen and Y and Y', and those osazones derived from a reducing saccharide and a substituted hydrazine of the formula

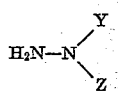

in which Y and Z are as herein defined.

The presently useful osazones are readily obtainable, in known manner, by the condensation of the appropriately substituted hydrazine with an appropriate compound containing the grouping

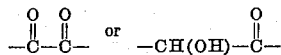

in the latter case with intermediate oxidation of the alcohol group by an excess of the hydrazine.

Hydrazine compounds employed for the preparation of the present useful hydrazones have the formula

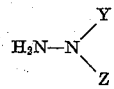

in which Y and Z are as above defined. One group of such hydrazines includes the alkyl or the 1,1-dialkylhydrazines having from 1 to 12 carbon atoms in the alkyl radical, e. g., ethyl-, amyl-, or n-octylhydrazine or 1,1-di-n-propyl, 1,1-diisohexyl- or 1-amyl-1-butylhydrazine. Another group includes the cycloalkyl- or 1,1-dicycloalkylhydrazines, e. g., cyclopentyl-, 1,1-dicyclohexyl- or 1-cyclohexyl-1-(4-methylcyclopentyl)hydrazine. Still another group includes the arylkyl- or the bis(1,1-diaralkyl)-hydrazines such as 2-phenylethylhydrazine or 1,1-dibenzyl-hydrazine. A very useful group includes hydrazines having an aryl or alkaryl radical of less than 13 carbon atoms attached to one nitrogen atom and either hydrogen or a hydrocarbon radical free of non-benzenoid unsaturation attached to the same nitrogen atom, e. g., phenylhydrazine, p-tolylhydrazine, (2,4-dimethylphenyl)-hydrazine or (2-ethylphenyl)hydrazine and the 1-alkyl, aryl, aralkyl, alkaryl or cycloalkyl derivatives thereof such as 1-methyl-1-phenylhydrazine, 1-isoamyl-1-phenylhydrazine, 1-cyclohexyl-1-o-tolylhydrazine, 1-benzyl-1-phenylhydrazine, 1,1-diphenylhydrazine, etc. In the useful hydrazines, there may be only one hydrocarbon radical attached to one of the nitrogen atoms or there may be two of the same hydrocarbon radicals or two dissimilar hydrocarbon radicals attached to the one nitrogen atom. Because of the easy availability of phenylhydrazine, the condensation products of this particular hydrazine derivative and the dicarbonyl or hydroxycarbonyl compounds are advantageously used in the preparation of the present fungicidal compositions. The term osazones will be extended for the sake of convenience to include not only the bis(phenylhydrazones) but also the products obtained from one mole of the dicarbonyl compounds and two moles of the substituted hydrazines of the above formula.

Dicarbonyl compounds useful in preparing the presently employed osazones are dialdehydes, diketones or ketoaldehydes having two adjacent carbonyl radicals. As will be apparent to those skilled in the art, such dicarbonyl compounds include glyoxal and derivatives. These derivatives in which one of the hydrogen atoms of glyoxal has been replaced are keto-aldehydes, and those derivatives of glyoxal in which both hydrogen atoms of the glyoxal have been replaced are diketones, thus:

Glyoxal

Keto-aldehyde

Diketones

Examples of keto-aldehyde osazones useful for the present purpose are:

Pyruvaldehyde, $CH_3CO.CHO$
Phenylpyruvaldehyde, $C_6H_5CH_2CO.CHO$
Isopropylglyoxal, $(CH_3)_2CHCO.CHO$
Phenylglyoxal, $C_6H_5CO.CHO$
4-nitrophenylglyoxal, $4\text{-}NO_2C_6H_4CO.CHO$
4-tolylglyoxal, $CH_3C_6H_4CO.CHO$
2,4,6-triethylphenylglyoxal, $(C_2H_5)_3C_6H_2CO.CHO$
2,4-xylylglyoxal, $(CH_3)_2C_6H_3CO.CHO$
4-biphenylylglyoxal, $C_6H_5C_6H_4CO.CHO$
Naphthaleneglyoxylaldehyde
Cyclopropaneglyoxylaldehyde
Cyclohexaneglyoxylaldehyde Osazones of the following α-diketones are useful as the effective ingredients of the present fungicidal compositions:

2,3-butanedione, $CH_3CO.CO.CH_3$
1,4-diphenyl-2,3-butanedione, $C_6H_5CH_2CO.CO.CH_2C_6H_5$
1,4-dicyclohexyl-2,3-butanedione
Benzil, $C_6H_5CO.COC_6H_5$
4,4'-diphenylbenzil, $C_6H_5C_6H_4CO.COC_6H_4C_6H_5$
1-phenyl-1,2-butanedione, $C_6H_5CO.COCH_2CH_3$
1-(3-nitrophenyl)-1,2-propanedione, $NO_2C_6H_4CO.COCH_3$
2,3-pentanedione, $CH_3CH_2CO.COCH_3$ 2,3-hexanedione, CH₃CH₂CH₂CO.COCH₃
5-methyl-2,3-hexanedione, (CH₃)₂CHCH₂CO.COCH₃
3,4-hexanedione, CH₃CH₂COCOCH₂CH₃
2,7-dimethyl-4,5-octanedione,
    (CH₃)₂CHCH₂COCOCH₂CH(CH₃)₂

A class of osazones which is especially useful as the effective ingredient of the present fungicidal compositions comprises the osazones of certain compounds containing the —CH(OH).CO— grouping. This class includes the α-hydroxy ketones and the α-hydroxy aldehydes. Condensation of either the α-hydroxy ketones or the α-hydroxy aldehydes yields the same osazone. In each case the osazones have the grouping

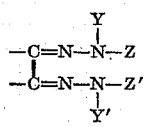

of the general formula shown hereinbefore.

The following α-hydroxy ketones are useful in the preparation of the present fungicidal osazones:

Hydroxyacetone, CH₃COCH₂OH
1-hydroxy-2-butanone, HOCH₂COCH₂CH₃
3-hydroxy-2-butanone, CH₃CH(OH)COCH₃
3-hydroxy-2-pentanone, CH₃CH₂CH(OH)COCH₃
1,3-dihydroxyacetone, OHCH₂COCH₂OH
1-hydroxypropyl methyl ketone,

CH₃CH₂CH(OH)COCH₃

Benzyl hydroxymethyl ketone, C₆H₅CH₂COCH₂OH
α-Hydroxyacetophenone, C₆H₅COCH₂OH
1-hydroxyethyl phenyl ketone, C₆H₅COCH(OH)CH₃
Benzyl 1-hydroxyethyl ketone, C₆H₅CH₂COCH(OH)CH₃
α-Hydroxybenzyl 4-nitrophenyl ketone,

C₆H₅CH(OH)COC₆H₄NO₂

Hydroxymethyl 2-methylcyclopentyl ketone

Osazones of the following α-hydroxy aldehydes are effective fungicidal ingredients of the present compositions:

Glycolaldehyde, HOCH₂.CHO
Benzylglycolaldehyde, C₆H₅CH₂CH(OH).CHO
Lactaldehyde, CH₃CH(OH).CHO
Mandelic aldehyde, C₆H₅CH(OH)CHO
Glyceraldehyde, CH₂(OH)CH(OH).CHO
Phenylglyceraldehyde, C₆H₅CH(OH)CH(OH).CHO The osazones of the two simplest members of the class of monosaccharides, i. e., those of glycerylaldehyde fungicidally active hydroxy aldehydes and hydroxy and of dihydroxyacetone have been shown above under ketones, respectively. Osazones of the monosaccharides, i. e., of aldoses and ketoses, as well as of the reducing di- and poly-saccharides, are of particular interest for the present purpose in that they are not only readily available, but also extremely effective, especially against the generally highly resistant wheat rust fungi.

As is known to the art, an aldose, i. e., the aldehydic monosaccharide, will give the same phenylosazone as the isomeric ketone, i. e., the corresponding ketonic monosaccharide. Hence in the following list of the presently useful osazones, duplication may occur with respect to the phenylosazone, even though the monosaccharide sources differ. Also, as is likewise known to those skilled in the art, whereas phenylhydrazine reacts with either an aldose or a ketose to form a phenylosazone, the 1-alkyl-1-phenylhydrazines yield the 1-alkyl-1-phenyl osazones with ketoses but not with aldoses. However, since the 1-alkyl-1-phenylosazone, when desired, is obtainable from the ketose, the lack of reactivity of substituted hydrazines, generally, with monosaccharides, generally, is not to be considered as a limitation of the term "osazone" to only the phenylosazones.

Monosaccharide osazones useful for the present purpose are those having the formula

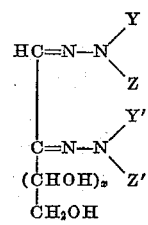

in which Y and Y' are hydrocarbon radicals free of nonbenzenoid unsaturation, Z and Z' are Y or Y' or hydrogen and x is an integer of 0 to 6.

Examples of useful osazones include those of the trioses mentioned above (glycerylaldehyde and dihydroxyacetone), of the tetrose, erythrose formed by oxidation of erythritol, and of the following pentoses, hexoses, heptoses, octoses and nonoses:

d-Glucose ⎫
d-Fructose (levulose) ⎬ give the same phenylosazone
d-Mannose ⎭ dl-Mannose ⎫ Give the same phenylosazone
dl-Fructose ⎭

Arabinose ⎫ Give the same phenylosazone
Ribose ⎭ d-Tagatose ⎫
d-Galactose ⎬ Give the same phenylosazone
Talose ⎭

Xylose
Sorbose
Rhamnose
Mannoheptose
Glucoheptose
Mannooctose
Mannononose

In addition to osazones of the monosaccharides, there may be used for the present purpose the osazones of the reducing polysaccharides, i. e., those of the polysaccharides which have retained the monosaccharide carbonyl radical. Such fungicidally useful osazones include those of the following:

Maltose
    Lactose
    Cellobiose
    Gentiobiose
    Melibiose
    β-Glucosidomaltose
    Mannotriose The presently useful saccharide osazones, whether derived from a monosaccharide or a reducing di- or polysaccharide are compounds in which the grouping

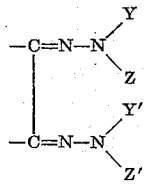

forms a part of the saccharide molecule.

We have discovered that the osazones herein defined are highly efficient for preventing and retarding fungus growth on plants, fruits, seeds, soils, fur, leather, cotton, wood and organic materials in general. They may be applied directly to the organic material which is to be treated, but because the osazones are effective in extremely dilute concentrations, it is preferred to incorporate them with a carrier or diluent.

Fungicidal dusts may be prepared by mixing the osazones with dusting materials such as talc, clay, lime, bentonite, pumice, fuller's earth, etc. The majority of the osazones will be found to be water-insoluble. These may be dissolved in organic solvents therefor and the resulting solutions used as fungicidal or fungi-preventing sprays. More expediently, a small amount of a concentrated solution of the osazone in an organic solvent, e. g., cyclohexanone, may be added to water in the presence of an emulsifying agent to form an emulsion, and the oil-in-water emulsion thus obtained is employed as a spray. Suspensions or dispersions of the osazones in a non-solvent such as water, or aqueous solutions of water-soluble osazones, are advantageously employed in the treatment of such plant foliage, textile, leather or other material with which it is not desirable to employ either a solid carrier or an organic solvent.

Fungicidal compositions comprising the present active ingredients may be applied only to the surface of the material to be treated as when treating foliage, fur, leather and other comparatively impregnable materials upon which fungus growth is to be prevented or retarded. In other cases, for example, when it is desired to protect seeds from soil microorganisms harmful to the seeds and plants, the osazones, preferably incorporated with a solid carrier, may be simply mixed with the seed. For protection of fruits, seeds, plant tubers, etc., during storage, it may be advantageous to effect the treatment by employing baths comprising aqueous emulsions of the fungicides. Impregnation of textiles with the fungicide is also advantageously effected in baths.

The present osazones are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance. In prior art, much effort has been expended in breeding rust-resistant strains of these cereals; but as new strains of, e. g., wheat, are developed, new races of the above classes of rusts appear and proceed to attack the new, presumably rust-resistant, strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance. Also, in this type of application, the range between fungicidally effective concentration and phytotoxic concentration must be much wider and the volatility of the effective compound and carrier must be much less than is required in ground procedures.

The present invention is further illustrated, but not limited, by the following examples:

Example 1

The therapeutic effect of glyoxal phenylosazone was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

100 mg. of the test chemical, i. e., the glyoxal phenylosazone, was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the osazone. For the instant test the 1% emulsion was further diluted with water to give a concentration of 0.1% by weight of the osazone.

Spraying of the plants with the 0.1% emulsion was effected by means of an atomizer, 5 ml. of the emulsion being used per pot of 5 plants. The sprayed plants were then returned to the greenhouse and held there for a week. Observation of the plants at the end of that time disclosed no rust pustules on the inoculated and sprayed plants and no evidence of any phytotoxic effect of the spray. Similarly inoculated, but unsprayed plants, which had been maintained in the incubator and greenhouse for the same length of time were found to be badly affected by the rust.

Example 2

This example shows evaluation of the rust eradicating effect of biacetyl (2,3-butanedione) phenylosazone. The test was conducted substantially as described in Example 1, except that the emulsion with which the plants were sprayed contained a concentration of 0.25% of the osazone. Inspection of the plants 1 week after spraying showed no rust pustules and no phytotoxic effect of the spray. In order to determine the concentration range between rust preventing effect and phytotoxic effect, wheat plants were also sprayed with a similarly prepared emulsion containing 0.5% of the osazone and 0.1% of the osazone respectively. No phytotoxic effect was demonstrated at either concentration.

Example 3

This example is like Example 2 except that instead of using biacetyl phenylosazone, d-glucosazone was used. At a 0.25% concentration this osazone completely inhibited the appearance of the rust and showed no phytotoxicity at either an 0.5%, 0.25% or 0.1% concentration.

Example 4

A culture medium was prepared by adding 4-nitrophenylglyoxal phenylosazone to melted Sabouraud's dextrose agar to give a concentration of 1 part of the osazone per thousand parts of the agar and the resulting mixture was poured into sterile Petri dishes and allowed to harden. The hardened medium was then inoculated with a spore suspension of the fungus *Aspergillus niger*. Examination of the inoculated medium after a 5 day incubation period at 25° C. showed no growth of the fungus. Blank tests made by inoculating plates of only the agar showed profuse growth of the fungus at the end of the same incubation period.

The 4-nitrophenylglyoxal osazone was also tested against wheat rust using the testing procedure described in Example 1. It was found to prevent completely the rust at a concentration of 0.5%.

Example 5 d-Arabinose phenylosazone was tested against wheat rust as in Example 1. Complete inhibition of the fungus was affected at a 1% concentration. When tested against

*Aspergillus niger* by the procedure used in Example 4 it was found to inhibit completely appearance of the fungus at a concentration of 1 part of the osazone per thousand parts of the agar.

What we claim is:

1. A fungicidal composition comprising water, an emulsifying agent and an osazone selected from the class consisting of those osazones having the formula

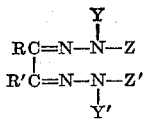

in which R and R' are selected from the class consisting of hydrogen, aliphatic and aromatic hydrocarbon radicals containing from 1 to 12 carbon atoms, and nitro-substituted aryl radicals of from 6 to 12 carbon atoms, Y and Y' are selected from the class consisting of aliphatic and aromatic hydrocarbon radicals containing from 1 to 12 carbon atoms and Z and Z' are selected from the class consisting of hydrogen and Y and Y', and those osazones derived from a reducing saccharide and a substituted hydrazine of the formula

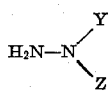

in which Y and Z are as herein defined.

2. A fungicidal composition comprising water, an emulsifying agent, and a phenylosazone of a reducing saccharide.

3. A fungicidal composition comprising water, an emulsifying agent, and glyoxal phenylosazone.

4. A fungicidal composition comprising water, an emulsifying agent, and d-glucosazone.

5. A fungicidal composition comprising water, an emulsifying agent, and the phenylosazone of 2,3-butanedione.

6. A fungicidal composition comprising water, an emulsifying agent, and the phenylosazone of d-arabinose.

7. A fungicidal composition comprising water, an emulsifying agent, and the phenylosazone of 4-nitrophenylglyoxal.

8. The method of protecting organic material susceptible to attack by fungi which comprises applying to said organic material, for the purpose of fungus-proofing, a fungicidal composition containing as the essential active ingredient an osazone selected from the class consisting of those osazones having the formula

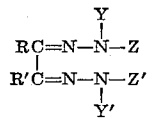

in which R and R' are selected from the class consisting of hydrogen, aliphatic and aromatic hydrocarbon radicals containing from 1 to 12 carbon atoms, and nitro-substituted aryl radicals of from 6 to 12 carbon atoms, Y and Y' are selected from the class consisting of aliphatic and aromatic hydrocarbon radicals containing from 1 to 12 carbon atoms and Z and Z' are selected from the class consisting of hydrogen and Y and Y', and those osazones derived from a reducing saccharide and a substituted hydrazine of the formula

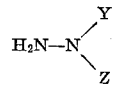

in which Y and Z are as herein defined.

9. The method of inhibiting the development of rust on cereal plants which comprises applying to said plants a rust inhibiting quantity of a fungicidal composition containing as an essential active ingredient an osazone selected from the class consisting of those osazones having the formula

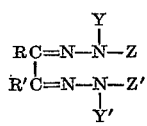

in which R and R' are selected from the class consisting of hydrogen, aliphatic and aromatic hydrocarbon radicals containing from 1 to 12 carbon atoms, and nitro-substituted aryl radicals of from 6 to 12 carbon atoms, Y and Y' are selected from the class consisting of aliphatic and aromatic hydrocarbon radicals containing from 1 to 12 carbon atoms and Z and Z' are selected from the class consisting of hydrogen and Y and Y', and those osazones derived from a reducing saccharide and a substituted hydrazine of the formula

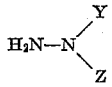

in which Y and Z are as herein defined.

10. The method of inhibiting the development of rust on wheat which comprises applying to the wheat a rust inhibiting quantity of a fungicidal composition comprising an osazone selected from the class consisting of those osazones having the formula

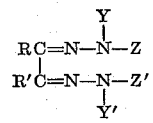

in which R and R' are selected from the class consisting of hydrogen, aliphatic and aromatic hydrocarbon radicals containing from 1 to 12 carbon atoms, and nitro-substituted aryl radicals of from 6 to 12 carbon atoms, Y and Y' are selected from the class consisting of aliphatic and aromatic hydrocarbon radicals containing from 1 to 12 carbons atoms and Z and Z' are selected from the class consisting of hydrogen and Y and Y', and those osazones derived from a reducing saccharide and a substituted hydrazine of the formula

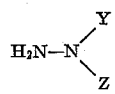

in which Y and Z are as herein defined.

11. The method of inhibiting the development of rust on wheat which comprises applying to the wheat a rust inhibiting quantity of a fungicidal composition comprising as the essential active ingredient a phenylosazone of a reducing saccharide.

12. The method of inhibiting the development of rust on wheat which comprises applying to the wheat a rust inhibiting quantity of a fungicidal composition comprising glyoxal phenylosazone as the essential active ingredient.

13. The method of inhibiting the development of rust on wheat which comprises applying to the wheat a rust inhibiting quantity of a fungicidal composition comprising the phenylosazone of 2,3-butanedione as the essential active ingredient.

14. The method of inhibiting the development of rust on wheat which comprises applying to the wheat a rust inhibiting quantity of a fungicidal composition comprising d-glucosazone as the essential active ingredient.

15. The method of inhibiting the development of rust on wheat which comprises applying to the wheat a rust inhibiting quantity of a fungicidal composition comprising 4-nitrophenylglyoxal phenylosazone as the essential active ingredient.

16. The method of inhibiting the development of rust on wheat which comprises applying to the wheat a rust inhibiting quantity of a fungicidal composition comprising d-arabinose phenylosazone as the essential active ingredient.

References Cited in the file of this patent

UNITED STATES PATENTS 2,758,050     Hackman _____ Aug. 7, 1956

FOREIGN PATENTS 462,599    Great Britain _____ July 13, 1936

OTHER REFERENCES

Horsfal: Fungicides and Their Action, 1945, Chronica Botanica Co., pp. 155 and 156.

Merck's Dictionary, 6th ed., 1952, Merck and Co., Rahway, N. J., pp. 93 and 464.

McNew, Phytopathology, vol. 39, 1949, pp. 721–751.

UNITED STATES PATENT OFFICE
CERTIFICATE OF CORRECTION

Patent No. 2,844,505　　　　　　　　　　　　　　　　　　　　July 22, 1958

Robert E. Miller et al.

It is hereby certified that error appears in the printed specification of the above numbered patent requiring correction and that the said Letters Patent should read as corrected below.

Column 3, line 52, strike out "fungicidally active hydroxy aldehydes and hydroxy" and insert the same after "under" in line 53, same column.

Signed and sealed this 3rd day of February 1959.

(SEAL)
Attest:

KARL H. AXLINE　　　　　　　　　　　　　　　　　　　　　　　　ROBERT C. WATSON
Attesting Officer　　　　　　　　　　　　　　　　　　　　　　Commissioner of Patents